United States Patent [19]
Jeong

[11] Patent Number: 5,801,301
[45] Date of Patent: Sep. 1, 1998

[54] OPERATING CONDITION DETECTING SYSTEM FOR AUTOMOTIVE VEHICLE

[75] Inventor: Dae Youp Jeong, Pyungtaek, Rep. of Korea

[73] Assignee: Mando Machinery Corporation, Gumpo, Rep. of Korea

[21] Appl. No.: 746,296

[22] Filed: Nov. 7, 1996

[30] Foreign Application Priority Data

Nov. 7, 1995 [KR] Rep. of Korea ............... 95-40063

[51] Int. Cl.$^6$ .................. G01M 15/00; G01L 5/28
[52] U.S. Cl. .................. 73/118.1; 73/493; 73/509; 73/510; 340/463; 340/465
[58] Field of Search ................ 73/116, 117.2, 73/117.3, 118.1, 121, 129, 489, 493, 495, 509, 510, 504.01, 504.03; 340/463, 465, 942

[56] References Cited

U.S. PATENT DOCUMENTS

| | | | |
|---|---|---|---|
| 3,359,042 | 12/1967 | Dave | 73/509 |
| 4,000,928 | 1/1977 | Takeuchi et al. | 73/493 |
| 4,337,651 | 7/1982 | Yoshino et al. | 73/129 |
| 4,393,695 | 7/1983 | Marshall et al. | 73/117.3 |
| 4,853,672 | 8/1989 | Yasuda et al. | 340/465 |
| 4,996,657 | 2/1991 | Shiraishi et al. | 340/465 |
| 5,097,707 | 3/1992 | Church | 73/504.01 |
| 5,097,917 | 3/1992 | Serizawa et al. | 340/465 |
| 5,269,187 | 12/1993 | Hanson | 73/495 |
| 5,369,580 | 11/1994 | Monji et al. | 73/510 |
| 5,597,954 | 1/1997 | Nakamura | 73/504.03 |

OTHER PUBLICATIONS

Müller et al., "Electronic Anti-Skid System—Performance and Application," SAE Technical Paper 725046, Jun. 1972, pp. 25–33.

Datron, "Davit Non–Contact Optical Sensors," Datron Internet Site (www.datron.com/dtsen.html), 4 pages, undated.

*Primary Examiner*—George M. Dombroske
*Attorney, Agent, or Firm*—Foley & Lardner

[57] ABSTRACT

An operation condition detecting system for an automobile vehicle includes a fifth wheel rotatably connected to a shaft protruding downward from the bottom center of an automobile chassis. A first sensor is installed around the fifth wheel's axle to measure an actual vehicle velocity and a bar extending from the fifth wheel's axle is connected to the shaft. The system also includes a yawing sensor provided at one end of the bar near the shaft to measure a yaw motion of the automotive vehicle. The yawing sensor includes a light emitting element and a light-receiving element and cooperates with reflectors reflecting the light from the light emitting element onto the light receiving element.

17 Claims, 3 Drawing Sheets

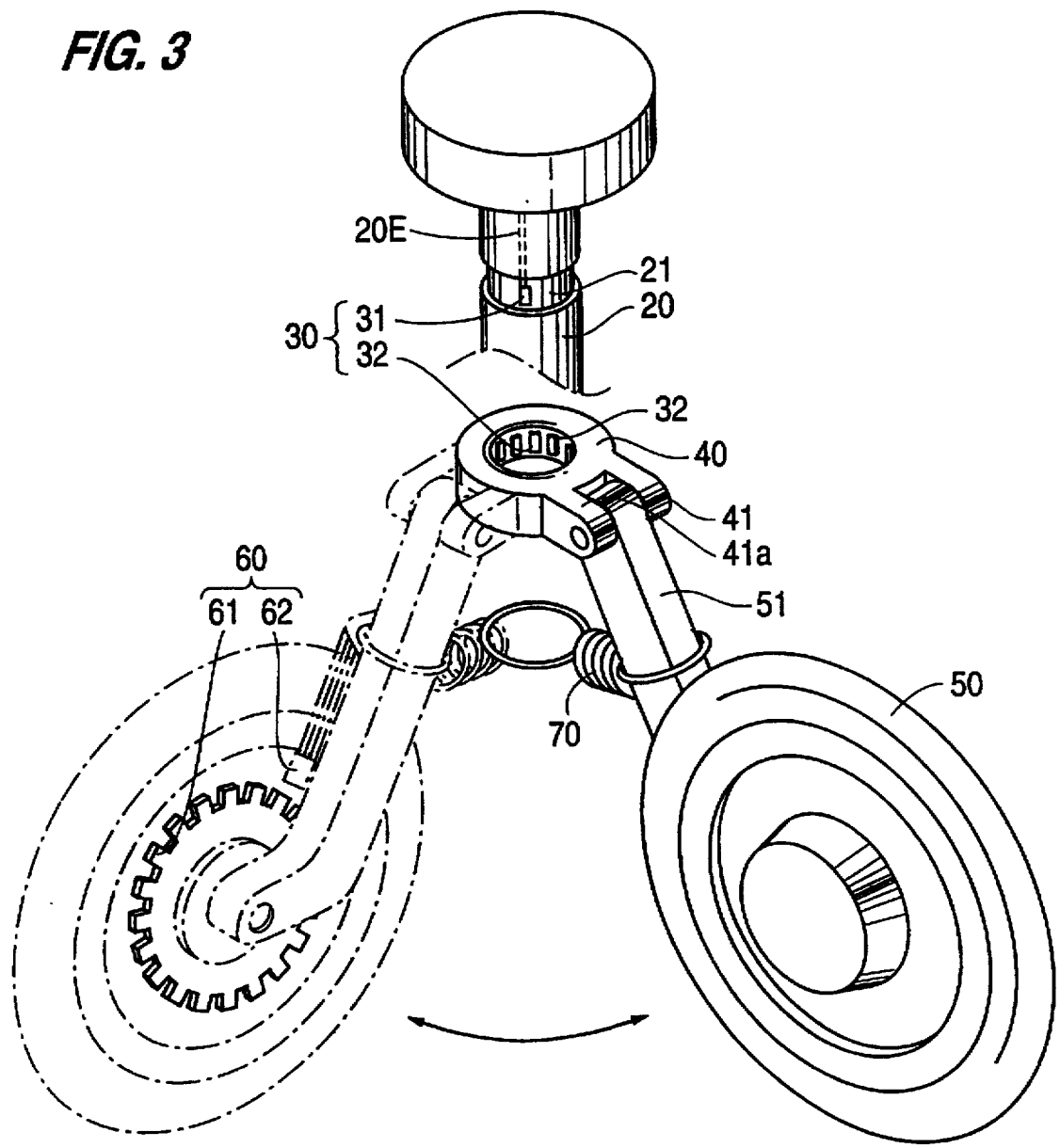

OPERATING CONDITION DETECTING SYSTEM FOR AUTOMOTIVE VEHICLE

FIELD OF THE INVENTION

The present invention relates generally to an operating condition detecting system for an automotive vehicle. More particularly, it relates to an operating condition detecting system for an automotive vehicle with a fifth vehicle wheel which can measure the yawing moment.

BACKGROUND OF THE INVENTION

In the course of many attempts to enhance automotive vehicle safety, an electronic safety apparatus which is a kind of dynamic safety system has been developed and used for automotive vehicles. Such an electronic safety apparatus for an automotive vehicle is realized through a wheel velocity sensor that monitors the speed of vehicle wheels, a steering angle sensor which senses the position of the steering mechanism of the vehicle, and a yawing sensor which monitors the actual driving track of the vehicle.

The wheel velocity sensor detects each wheel speed and generates an electric signal representative of the wheel velocity to an electronic control unit. The electronic control unit measures a pseudo vehicle velocity when braking the vehicle, on the basis of the input signal. There may however, be a difference between the actual vehicle velocity and the pseudo vehicle velocity when braking the vehicle. This is graphically shown in SAE Technical Paper 725046 presented at the XIV FISITA congress, England, June, 1972. The difference between the pseudo and actual vehicle velocities may deteriorate the performance of the dynamic safety system and adversely affect the efficiency of an antilock braking system (ABS) for the vehicle that controls the vehicle's braking system according to the pseudo vehicle velocity during braking.

Besides, the development of new model vehicles entails the trouble of modifying the control algorithm programmed in the electronic control unit to be suitably adapted to the corresponding four-wheel vehicle. Further, a yawing sensor is provided to dynamically adjust the position of the steering mechanisms by comparing the actual vehicle track with a standard vehicle track preset in the electronic control unit. An inertial G-sensor serves as the yawing sensor, but the inertial G-sensor is expensive.

Based on the above and foregoing, it can be appreciated that there presently exists a need in the art for an operating condition detecting system for an automotive vehicle which overcomes the above-described disadvantage of presently available system. The present invention fulfills this need.

SUMMARY OF THE INVENTION

Accordingly, it is an objective of the present invention to provide an operating condition detecting system for an automotive vehicle which can correctly measure the actual vehicle velocity necessary for the operation of the vehicle's dynamic safety system.

It is another objective of the present invention to provide an operating condition detecting system for an automotive vehicle which employs a unitary control algorithms for tis electronic control unit which does not need modification when applied to new vehicles.

The advantage of the invention may be obtained by means of the combinations particularly pointed out in the appended claims. The present invention discloses an operating condition detecting system for an automotive vehicle including a fifth wheel which is rotatably connected to a shaft protruding downward from the bottom center of an automobile chassis, and a first sensor which is installed around the fifth wheel's axle to measure an actual vehicle velocity. The bottom center of the automobile chassis corresponds directly to the center of gravity of the automotive vehicle.

The inventive operating condition detecting system also includes a bar which extends from the fifth wheel's axle to be connected with the shaft, a yawing sensor that is provided to one end of the bar being close to the shaft to measure a yawing moment of the automotive vehicle, a second sensor that forms the yawing sensor and has a light emitting element and a light receiving element, and reflectors which serves to reflect the light from the light emitting element onto the light receiving element. The yawing sensor is installed inside of the shaft, and the bar is designed to have one end rotatably connected to the shaft's outer circumference.

BRIEF DESCRIPTION OF THE ATTACHED DRAWING

In the drawings:

FIG. 3 is a partially-exploded perspective view of a yawing sensor in accordance with the present invention.

DETAILED DESCRIPTION OF PREFERRED EMBODIMENT

A preferred embodiment of the present invention will be now described in detail with reference to the accompanying drawings.

Figure 1:
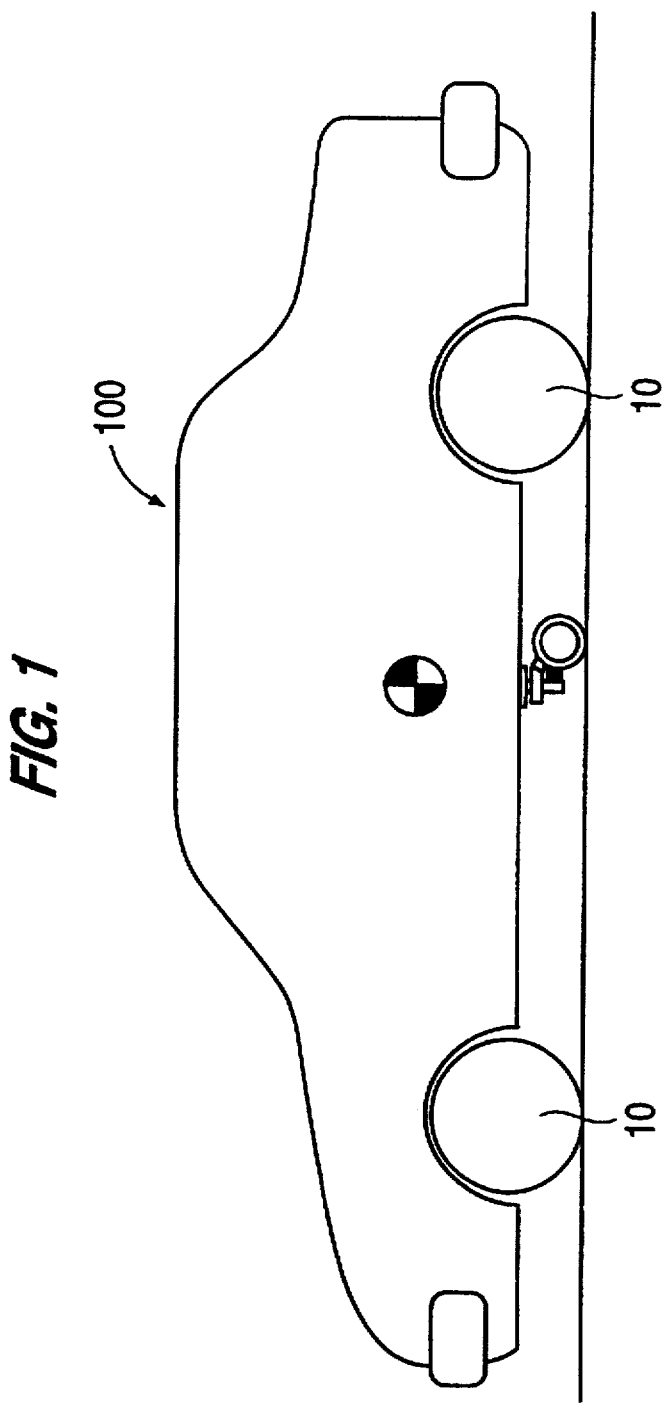
FIG. 1 is a side view of an automotive vehicle employing an operating condition detecting system in accordance with the present invention.

Referring to FIG. 1 which depicts an automotive vehicle 100 employing the inventive operating condition detecting system, this operating condition detecting system is installed right under the center of gravity of the vehicle 100 in order to detect the vehicle velocity, yawing moment and the like. Reference numeral 10 denotes vehicle wheels.

Figure 2:
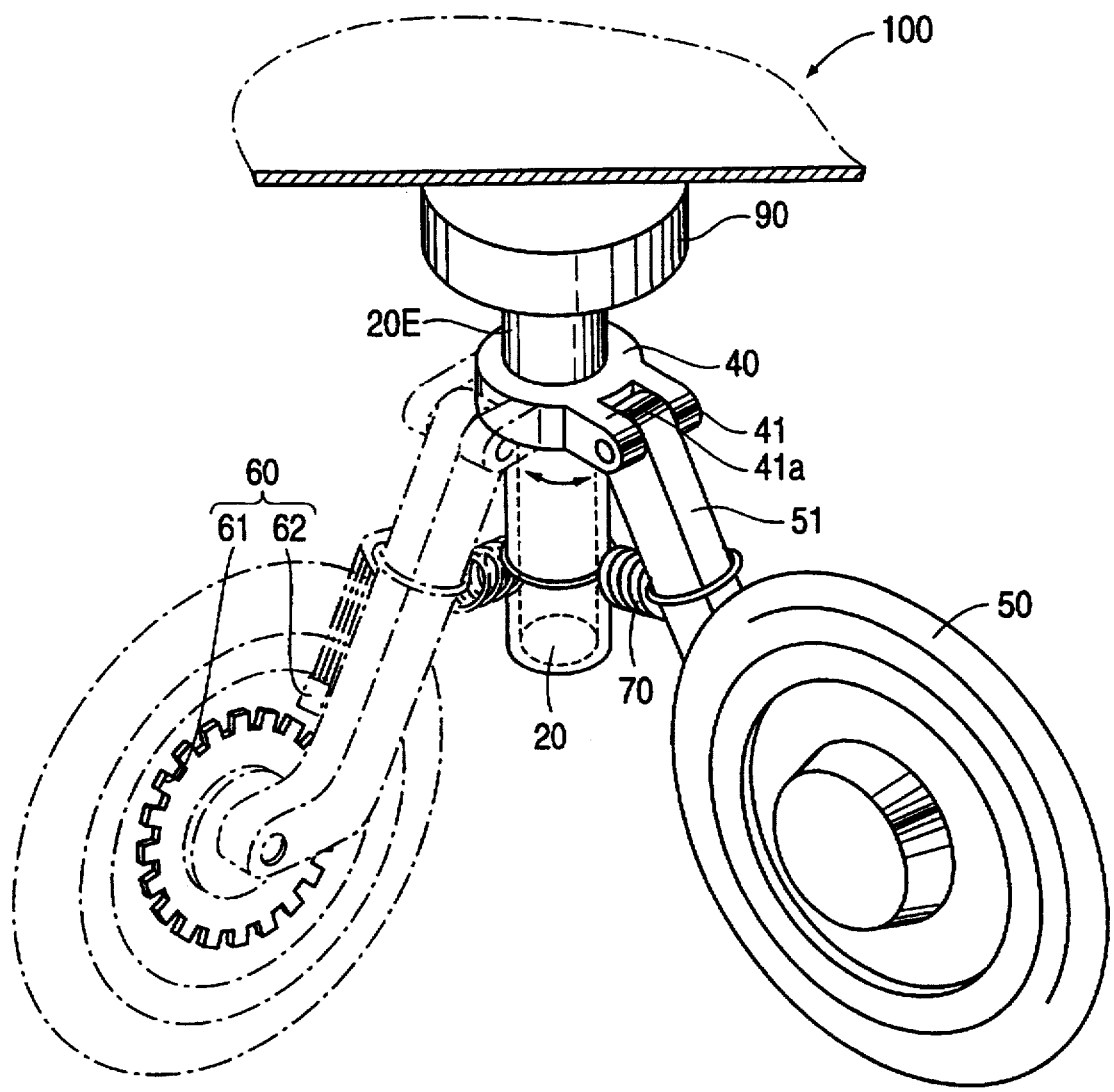
FIG. 2 is a perspective view of the operating condition detecting system constructed in accordance with the present invention.

FIG. 2 is a perspective view of the operating condition detecting system constructed in accordance with the present invention.

In FIG. 2 the inventive operating condition detecting system includes a hollow shaft 20 whose one end 20E is fixed to the bottom of the automotive vehicle 100 corresponding to its center of gravity, a connector 90 that is provided on the end 20E of the hollow shaft 20 and delivers an output signal of sensor (that will be described later) to an electronic control unit (not illustrated), and a rotary member 40 that is rotatably provided on the outer circumference of the hollow shaft 20.

Between lugs 41 and 41a of the rotary member 40 is interposed a connecting rod 51 which is connected with a fifth vehicle wheel 50 that can measure the actual vehicle velocity. More specifically, the upper portion of the connecting rod 51 is joined to the lugs 41 and 41a so as to move up and down therebetween. The fifth wheel 50 is rotatably connecting to the lower portion of the connecting rod 51. The operating condition detecting system also includes an elastic member 70 that is interposed between the hollow shaft 20 and the connecting rod 51 in order to apply tensile force to the connecting rod 51 so that the fifth wheel 50 can contact the ground at all times, a wheel speed sensor 60 which is provided around the axle of the fifth wheel 50 in order to measure the actual wheel velocity, and a yawing sensor (that will be described referring to FIG. 3).

The wheel speed sensor 60 consists of a sensor ring 61 having a plurality of teeth formed on its circumference, and an electronic rotary sensor 62 having a permanent magnet and a voltage generating coil. The teeth of the sensor ring 61 pass the tip of the rotary sensor 62 with the rotation of the fifth wheel 50, which leads to variation of magnetic flux in the voltage generating coil of the rotary sensor 62 to thereby produce voltage. Every time the teeth of the sensor ring 61 pass the tip of the rotary sensor 62, the voltage of frequency corresponding at the number of the teeth can be produced to the connector 90.

FIG. 3 is a partially-exploded perspective view of the inventive yawing sensor 30 that serves to measure the yawing moment of the vehicle 100.

The yawing sensor 30 consists of a sensor 31 which is disposed on a groove 21 formed on an outer surface of the hollow shaft 20, and reflectors 32 that are provided to the inside of the rotary member 40. The sensor 31 is formed of a light-receiving element which is a phototransistor (not illustrated), and a light emitting element that is a light emitting diode. The reflectors 32 are formed of a plurality of reflecting elements and are equidistantly disposed on the inner circumference of the rotary member 40. Such reflectors 32 reflect the light from the light emitting element so that the light can be delivered to the light receiving element.

The following description relates to the operation of the operating condition detecting system in accordance with the present invention.

As the vehicle 100 travels, the fifth wheel 50 rotates at the same speed as that of the vehicle wheels 10. Voltage of frequency corresponding to the number of the teeth of the sensor ring 61 is generated at the connector 90 as the teeth of the sensor ring 61 pass the tip of the sensors 62 with the rotation of the fifth wheel 50. Accordingly, the actual vehicle velocity can be measured by the use of the wheel speed sensor 60. On the other hand, when a driver brakes the vehicle 100 during driving, causing the vehicle wheels 10 to not rotate and skid, the wheel speed sensor for each vehicle wheel 10 would determine that the vehicle 100 had stopped. In the meantime, even after the vehicle 100 has seemingly stopped, the fifth wheel 50 goes on rotating at the actual vehicle velocity so that wheel speed sensor 60 can transfer the actual vehicle velocity to the connector 90.

When the driver tries to move the vehicle 100 to the left or right by turning a steering wheel (not illustrated) to the left or right, he changes the direction of the front wheels. The hollow shaft 20 fixedly provided to the vehicle 100 moves according to the driving direction of the vehicle 100. The fifth wheel 50 runs parallel to the driving direction of the vehicle 100 during straight driving.

At this point, the direction of the fifth wheel 50 makes an angle of 0° with the driving direction of the vehicle 100. During turns to the left or left, the direction of the fifth wheel 50 forms an angle of predetermined degrees (θ°) with the driving direction of the vehicle 100. Thus, the sensor 31 of the yawing sensor 30 detects the movement of the reflectors 32 provided on the inside of the rotary member 40, and sends an electric signal indicative of the actual driving track of the vehicle 100 into the electronic control unit.

After a predetermined period of time elapses, the fifth wheel 50 rotates around the hollow shaft 20 so that the direction of the fifth wheel 50 can be in parallel with the driving direction of the vehicle 100. The sensor 31 of the yawing sensor 30 then senses that the reflectors 32 return to their original positions, and sends an output signal indicative of the actual driving track of the vehicle 100 into the electronic control unit.

The electronic control unit (not illustrated) receives the electric signals generated respectively when the angle between the direction of the fifth wheel 50 and the driving direction of the vehicle 100 is 0° and when it is θ°. The electronic control unit controls the automotive vehicle 100 to travel inward during understeering in which the vehicle 100 runs outward leaving the standard driving track preset in the electronic control unit. In addition, when the vehicle 100 travels inward going off the standard driving track, i.e. during oversteering, the electronic control unit also controls the vehicle 100 to travel outward.

As described above, the present invention provides the fifth wheel rotatably connected to the hollow shaft protruding downward directly from the bottom of the automobile chassis that corresponds to its center of gravity. This fifth wheel can turn at the same speed as the actual vehicle velocity, even if the four wheels of the vehicle come to rotate abnormally during a panic stop or during traveling over an inhomogeneous road. The wheel velocity sensor of the present invention can measure correctly the actual vehicle velocity of various automotive vehicles. Besides, the efficiency of the fifth wheel to the driving direction of the vehicle can be enhanced thereby. Therefore, the inventive operating condition detecting system ensures an increase in driving safety.

What is claimed is:

1. An operating condition detecting system of an automotive vehicle comprising:

a shaft affixed to a bottom of the automotive vehicle at a center of gravity of the automotive vehicle;

a rotary member rotatably mounted on an outer circumference of the shaft and having a pair of lugs;

a connecting rod having an upper end and a lower end, the upper end connected pivotably to the lugs;

a fifth wheel having an axle rotatably connected to the lower end of the connecting rod; and a wheel speed sensor mounted adjacent to the axle of the fifth wheel.

2. The operating condition detecting system according to claim 1, further comprising:

a connector mounted on the shaft to deliver sensor signals from the wheel speed sensor to an electronic control unit of the automotive vehicle; and an elastic member, interposed between the shaft and the connecting rod, for biasing the connecting rod in a direction toward a road surface traversed by the automotive vehicle to cause the fifth wheel to contact the road surface.

3. The operating condition detecting system according to claim 1, wherein the wheel speed sensor includes:

a sensor ring mounted on and rotatable with the axle of the fifth wheel, the sensor ring having a plurality of teeth formed around its circumference, and an electronic rotary sensor mounted on the connecting rod, the electronic rotary sensor having a permanent magnet and a voltage generating coil that produces voltages in accordance with a magnetic flux variation caused by a rotation of the sensor ring.

4. The operating condition detecting system according to claim 1, further comprising:

a yaw sensor mounted at the center of gravity of the vehicle for indicating an actual driving track of the automotive vehicle.

5. The operating condition detecting system according to claim 4, wherein the shaft has groove formed around its outer circumference and wherein the yaw sensor includes a sensing portion disposed in the groove and reflectors formed on an inner circumference of the rotary member.

6. The operating condition detecting system according to claim 5, wherein the sensing portion of the yaw sensor includes a light receiving element and a light emitting element and wherein the reflectors are aligned with the sensing portion so that light emitted from the light emitting element is reflected off the reflectors to the light receiving element.

7. The operating condition detecting system according to claim 6, wherein the light receiving element comprises a phototransistor.

8. The operating condition detecting system according to claim 7, wherein the reflectors are disposed equidistant to each other on the inner circumference of the rotary member.

9. An automobile comprising four driving wheels and a fifth wheel assembly including a fifth wheel driven along a road surface transversed by the automobile, the fifth wheel assembly being connected to a center of gravity of the automobile for measuring a velocity and an actual driving track of the automobile.

10. The automobile according to claim 9, wherein the fifth wheel assembly further includes:

a rotational velocity sensor for measuring a rotational speed of the fifth wheel; and a yaw sensor for measuring a yaw position of the fifth wheel relative to the automobile, wherein the velocity of the automobile is derived from the rotational speed of the fifth wheel and the actual driving track of the automobile is derived from the yaw position of the fifth wheel relative to the automobile.

11. The automobile according to claim 10, wherein the fifth wheel assembly further includes:

a shaft protruding from the center of gravity of the automobile;

a rotary member rotatably mounted on an outer circumference of the shaft and having a pair of lugs;

a connecting rod having an upper end and a lower end, the upper end connected pivotably to the lugs; and an axle for the fifth wheel, the axle being rotatably connected to the lower end of the connecting rod.

12. The automobile according to claim 11, wherein the fifth wheel assembly further includes:

a connector mounted on the shaft to deliver sensor signals from the rotational velocity and yaw-sensors to an electronic control unit of the automobile; and an elastic member, interposed between the shaft and the connecting rod, for biasing the connecting rod in a direction toward the road surface to cause the fifth wheel to contact the road surface.

13. The automobile according to claim 11, wherein the rotational velocity sensor includes:

a sensor ring mounted on and rotatable with the axle of the fifth wheel, the sensor ring having a plurality of teeth formed around its circumference, and an electronic rotary sensor mounted on the connecting rod, the electronic rotary sensor having a permanent magnet and a voltage generating coil that produces voltages in accordance with a magnetic flux variation caused by a rotation of the sensor ring.

14. The automobile according to claim 11, wherein the shaft has groove formed around its outer circumference and wherein the yaw sensor includes a sensing portion disposed in the groove and reflectors formed on an inner circumference of the rotary member.

15. The automobile according to claim 14, wherein the sensing portion of the yaw sensor includes a light receiving element and a light emitting element and wherein the reflectors are aligned with the sensing portion so that light emitted from the light emitting element is reflected off the reflectors to the light receiving element.

16. The operating condition detecting system according to claim 15, wherein the light receiving element comprises a phototransistor.

17. The operating condition detecting system according to claim 16, wherein the reflectors are disposed equidistant to each other on the inner circumference of the rotary member.

* * * * *